US005975683A

United States Patent [19]
Smith et al.

[11] Patent Number: 5,975,683
[45] Date of Patent: Nov. 2, 1999

[54] ELECTRIC-FIELD MANIPULATION OF EJECTED INK DROPS IN PRINTING

[75] Inventors: Donald Leonard Smith, Palo Alto; Richard Gregory Stearns, Felton, both of Calif.

[73] Assignee: Xerox Corporation, Stamford, Conn.

[21] Appl. No.: 08/480,977

[22] Filed: Jun. 7, 1995

[51] Int. Cl.$^{6}$ .................... G01D 15/16

[52] U.S. Cl. .................... 347/55; 347/46

[58] Field of Search .................... 347/46, 48, 55

[56] References Cited

U.S. PATENT DOCUMENTS

| | | | |
|---|---|---|---|
| 3,673,601 | 6/1972 | Hertz . | |
| 4,379,301 | 4/1983 | Fischbeck . | |
| 4,386,358 | 5/1983 | Fischbeck . | |
| 4,571,597 | 2/1986 | Kocot | 346/75 |
| 5,179,394 | 1/1993 | Hoshino et al. | 346/140 R |
| 5,305,016 | 4/1994 | Quate | 340/140 R |
| 5,520,715 | 5/1996 | Oeftering | 75/335 |

FOREIGN PATENT DOCUMENTS

| | | |
|---|---|---|
| 0 473 178 | 3/1992 | European Pat. Off. . |
| 0 608 879 | 8/1994 | European Pat. Off. . |
| 56-042663 | 4/1981 | Japan . |

*Primary Examiner*—Daniel P. Malley
*Attorney, Agent, or Firm*—Oliff & Berridge, P.L.C.

[57] ABSTRACT

A method and apparatus is provided which compensates for environmental factors which cause misdirection of ink drops ejected from an ink jet printhead. Ink drops are electrostatically accelerated in a direction perpendicular to a print substrate, decreasing the ink drop flight time from the printhead to print substrate. The decrease in flight time decreases the misdirecting effect of the environmental factors on the ink drops since the environmental factors act on the ink drops for a shorter amount of time. Accelerating the ink drops also increases the spot size created when the drop impacts the print substrate, decreasing the amount of ink needed to create an image on the print substrate. The decrease in ink use results in less cockle and curl in the print substrate. The device also provides electrostatic deflection of the ink drops in directions parallel to the print substrate, increasing the resolution of the printhead.

7 Claims, 9 Drawing Sheets

ELECTRIC-FIELD MANIPULATION OF EJECTED INK DROPS IN PRINTING

BACKGROUND OF THE INVENTION

1. Field of the Invention

This invention generally relates to electric-field manipulation of ink drops in printing. In particular, the invention relates to electric-field acceleration and steering of the ink drops to increase the placement accuracy of the ink drops and the resolution capability of a printer.

2. Description of Related Art

Conventional ink drop printing systems use various different methods to produce ink drops directed toward a print substrate. Well-known devices for ink drop printing include thermal ink jet printheads, piezoelectric transducer-type ink jet printheads, and acoustic ink jet printheads. All of these technologies produce roughly spherical ink drops having a 15–100 micron diameter directed toward a print substrate at approximately 4 m/sec. The actuators in the printheads which produce the ink drops are controlled by a printer controller. The printer controller activates the actuators in conjunction with movement of the print substrate relative to the printhead. By controlling the activation of the actuators and the print substrate movement, the print controller directs the ink drops to impact the print substrate in a specific pattern, thus forming an image on the print substrate.

Ideally, all of the actuators in a printhead produce ink drops directed toward the print substrate in a direction perpendicular to the print substrate. In practice, however, some ink drops are not directed exactly perpendicular to the print substrate. The ink drops which deviate from the desired trajectory are undesirable since the misdirected drops impact the print substrate at a point not anticipated by the print controller. Therefore, misdirected drops affect the quality of the printed image by impacting the print substrate in unwanted positions.

U.S. Pat. Nos. 4,386,358 and 4,379,301 to Fischbeck disclose a method for electrostatically deflecting electrically charged ink drops ejected from an ink jet printhead. Charges placed on electrodes on the printhead disclosed by Fischbeck are controlled to steer the charged ink drops in desired directions to compensate for known printhead movement. By electrostatically steering the charged ink drops, the method disclosed in Fischbeck compensates for ink drop misdirection caused by the known printhead movement when the ink drop is ejected.

However, the electrostatic deflection method disclosed by Fischbeck does not compensate for unpredictable environmental factors which can affect ink drop trajectories. Such environmental factors include air currents and temperature gradients between the printhead and the print substrate. In acoustic ink jet printheads, unpredictable variations in the dynamics of ink drop creation also detrimentally affect ink drop trajectories. Some of the variations in ink drop creation are caused by aberrations in the lithography of the Fresnel lens which focusses the acoustic wave used to create the ink drops.

SUMMARY OF THE INVENTION

This invention provides a device which compensates for unpredictable environmental factors which cause ink drops to have a trajectory other than the desired trajectory.

The invention also provides a device which accelerates drops in a direction perpendicular to the print substrate so that less ink is needed to produce an image and therefore paper cockle and curl are decreased or diminished.

The invention further provides a device for steering ink drops in a direction parallel to the print substrate such that the resolution capacity of the printhead is increased.

This invention compensates for deviations in the desired trajectory of each ink drop ejected from the printhead by accelerating the ink drops in a direction perpendicular to the print substrate. Each ink drop ejected from the printhead is accelerated toward the print substrate by electrostatic attraction. Accelerating each ink drop toward the print substrate compensates for the various environmental factors affecting ink drop trajectory by decreasing the flight time of each ink drop. By decreasing the flight time of each ink drop, the environmental factors tending to force the ink drop from a desired trajectory have less time to act upon the ink drop. Therefore, the environmental factors misdirect each ink drop to a lesser extent than if the ink drop moved more slowly toward the print substrate.

By accelerating the ink drops in the direction perpendicular to the print substrate, the invention also increases the size of the spot created when the ink drop impacts the print substrate. The larger spot size is due to the increased spreading upon impact resulting from the higher ink drop velocity and means that less ink is needed to produce an image on the print substrate. Cockle and curl in a print substrate are generally caused by ink saturation of the substrate. Therefore, since the amount of ink needed to produce an image is lessened, cockle and curl of the print substrate is lessened or eliminated.

The invention steers ink drops by electrostatically deflecting the ink drops in directions parallel to the print substrate. By appropriately controlling the electrostatic deflection, the ink drops created by each column of actuators in the printhead are selectively directed to impact the print substrate at positions both left of a center position and right of the center position. The ink drops not deflected impact the print substrate at the center position. This means that each actuator can create at least two vertical print columns of spots on the print substrate. Therefore, the number of differently positioned spots created by each actuator is increased.

BRIEF DESCRIPTION OF THE DRAWINGS

Description of the invention will be made with reference to the following figures, wherein like reference numerals refer to like elements, and.

DESCRIPTION OF THE PREFERRED EMBODIMENTS

Figure 1:
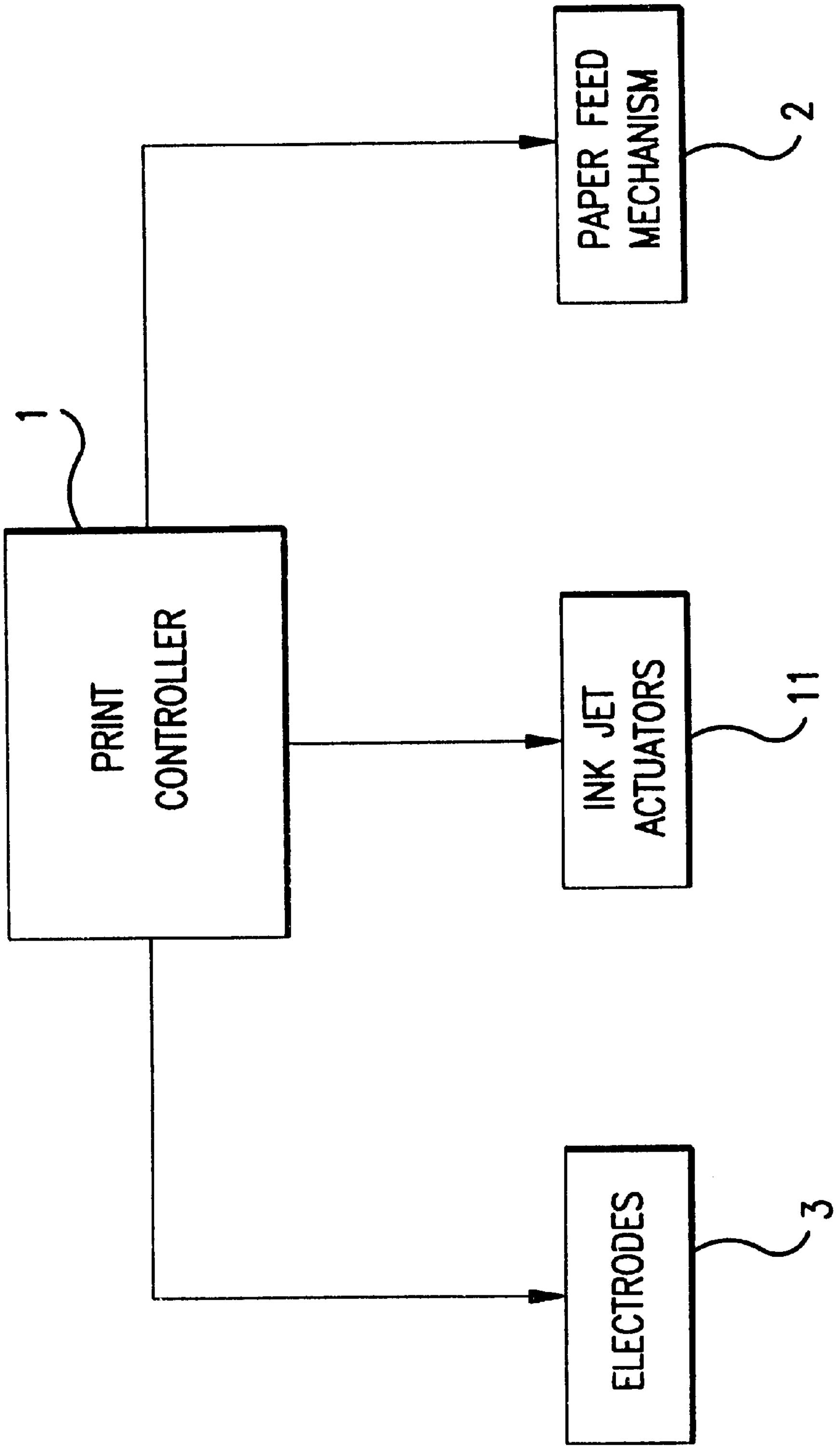
FIG. 1 is a block diagram of the general preferred embodiments of the invention.

FIG. 1 shows the communication between a print controller 1, a paper feed mechanism 2, a plurality of ink jet actuators 11, and the electrodes 3 in the general preferred embodiments of the invention. The print controller 1 directly communicates with and controls the paper feed mechanism 2, which moves the print substrate relative to the printhead. The print substrate is generally a sheet of paper, but can be formed of other materials. In the following preferred embodiments of the invention, the ink jet printhead is a page-width printhead and the print substrate is moved relative to the printhead. However, other embodiments are possible, including moving an ink jet printhead cartridge relative to the print substrate or moving both the ink jet printhead cartridge and the print substrate simultaneously.

The print controller 1 also controls a set of ink drop actuators 11 (e.g., drop expelling means) formed in the printhead. In the following preferred embodiments of the invention, an acoustic ink drop printhead is used, although other types of ink drop actuators are possible, including thermal ink jet and piezoelectric transducer-type ink jet actuators.

Finally, the print controller 1 directly communicates with and controls one or more sets of electrodes 3 (e.g., drop accelerating means) which accelerate ink drops in directions perpendicular and parallel to the print substrate.

Figure 2:
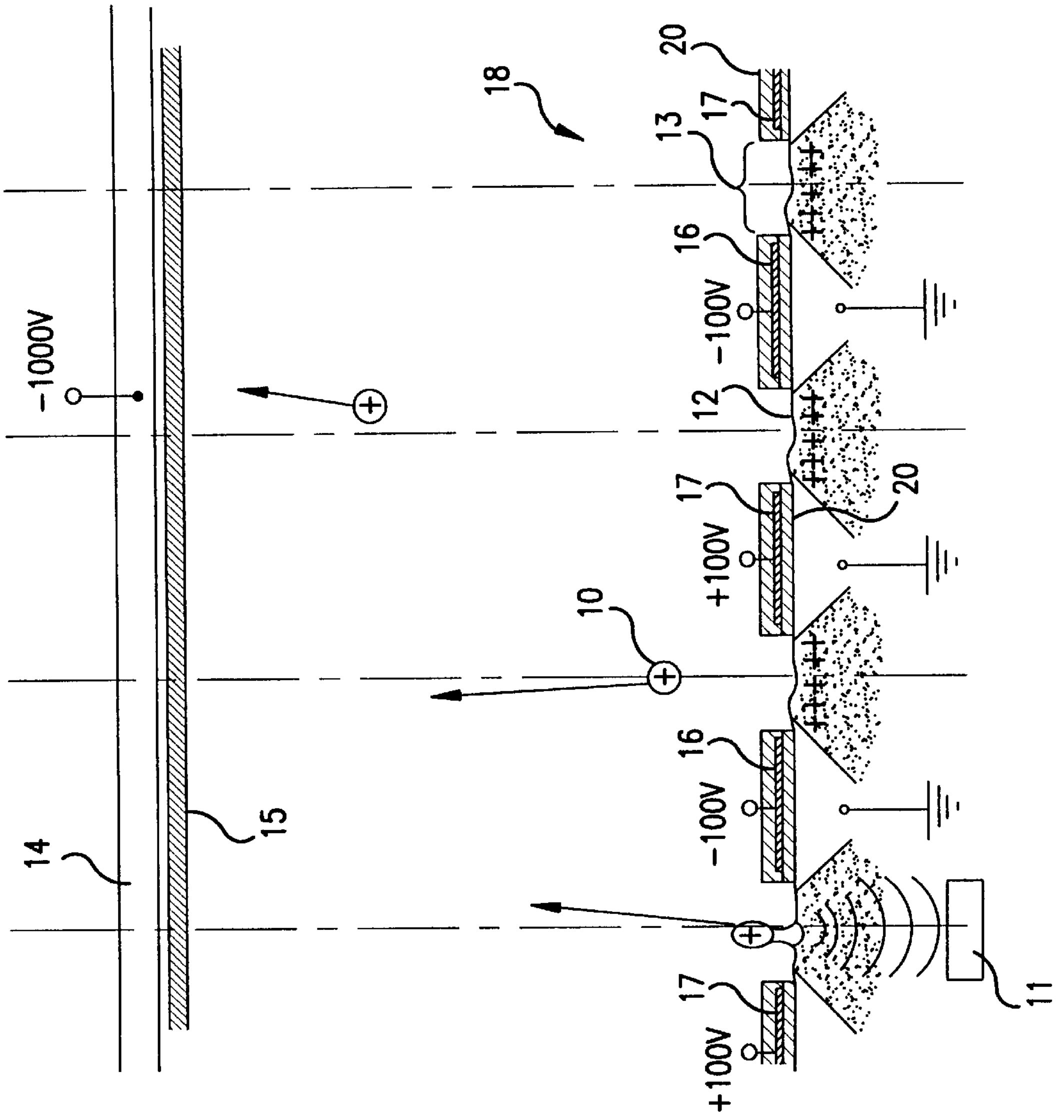
FIG. 2 is a first preferred embodiment of the invention in which ink drops are accelerated toward a print substrate and steered by electrodes formed on the face of the printhead.

FIG. 2 shows a first preferred embodiment of the invention. A printhead 18 ejects ink drops 10 through apertures 13 directed toward a print substrate 15 using acoustic actuators 11. Each acoustic actuator 11 has a piezoelectric transducer which creates a sound wave in the ink. A lens, such as a Fresnel lens, focuses the wave at the ink surface 12. Acoustic pressure at the ink surface 12 causes an ink drop 10 to form which is directed toward the print substrate 15 at an ejection velocity of approximately 4 m/sec. Wave effects at the ink surface 12 and other physical effects cause variations in the velocity and the trajectory of the ink drops 10. Thus, although all of the ink drops 10 are ideally directed in a direction perpendicular to the print substrate 15, in practice some of the ink drops 10 are misdirected and have velocity components parallel to the print substrate 15.

Positive ions in the ink congregate at the ink surface 12 in response to a high negative potential, approximately −1000V , placed on the charging plate 14, which is positioned behind the print substrate 15. This effect is enhanced by the protrusion of the ink during ink drop 10 formation. Therefore, when each ink drop 10 separates from the ink surface 12, the ink drop 10 is positively charged. The positively charged ink drop 10 carries a charge on the order of $2\times10^{-14}$ C and is strongly attracted toward the charging plate 14. As the ink drop 10 travels the 1 mm distance separating the printhead 18 and the print substrate 15, the ink drop 10 is accelerated to approximately 3 or 4 times its original ejection velocity, or approximately 12–16 m/sec. The acceleration of the ink drop 10 decreases the amount of time, the flight time, the ink drop 10 takes to travel the 1 mm distance to the print substrate 15.

Therefore, the environmental factors, such as air currents, temperature gradients, ink drop formation variations, and the like, which cause misdirection of the ink drop 10 have a shorter period of time to act upon the ink drop 10. Accordingly, the ink drops 10 tend to impact the print substrate 15 at points closer to the desired position (directly opposite the aperture 13) than if the ink drops 10 were not accelerated toward the print substrate 15.

For example, assume the ink drop 10 has a velocity component of 4 m/sec in a direction perpendicular to the print substrate 15. Thus, it takes the ink drop 10 0.25 milliseconds to travel the 1 mm distance separating the printhead 18 and the print substrate 15. Assume also that the ink drop 10 has a velocity component in a direction parallel to the print substrate 15 due to an instability effect when the drop 10 was created equal to 0.01 m/sec. Therefore, the ink drop 10 will impact the print substrate 15 at a point approximately 2.5 microns from the desired position. If the ink drop 10 were accelerated toward the print substrate 15 such that the flight time of the ink drop 10 was decreased by half, or 0.125 milliseconds, the ink drop 10 would impact the print substrate 15 at a point approximately 1.25 microns from the desired position.

Also shown in FIG. 2 are the steering electrodes 16 and 17, which are formed on the face of the printhead 18 nearest the print substrate 15. An insulating layer 20 separates the steering electrodes 16 and 17 from the printhead 18 and also covers the steering electrodes 16 and 17. The steering electrodes 16 and 17 are encased in the insulating layer 20 to avoid short circuits and corrosion of the steering electrodes 16 and 17 due to stray ink droplets or other foreign matter on the steering electrodes 16 and 17. The steering electrodes 16 and 17 can be formed on the printhead 18 in a variety of different ways, including screen printing, sputter deposition using a shadow mask, photolithographic patterning or other standard lithography techniques. The steering electrodes 16 and 17 are preferably formed of a conductive metal, such as aluminum, gold, nickel or the like.

The steering electrodes 16 and 17 communicate with the print controller 1, which selectively charges the steering electrodes 16 and 17 to steer the charged ink drops 10 in a desired direction. For example, an ink drop 10, which is ejected from an aperture 13 positioned to the right of a first steering electrode 16 having a potential of −100V and to the left of a second steering electrode 17 having a potential of +100V , will be deflected to the left toward the first steering electrode 16 in accordance with well-known electrostatic principles. Likewise, if the potentials on the steering electrodes 16 and 17 are reversed, the ink drop 10 will be deflected to the right. If the steering electrodes 16 and 17 are both set to a 0V potential, the ink drop 10 will travel in a center trajectory and not be directed toward either the left or the right. Other voltage potentials can be used as will be appreciated by those skilled in the art.

Figure 3:
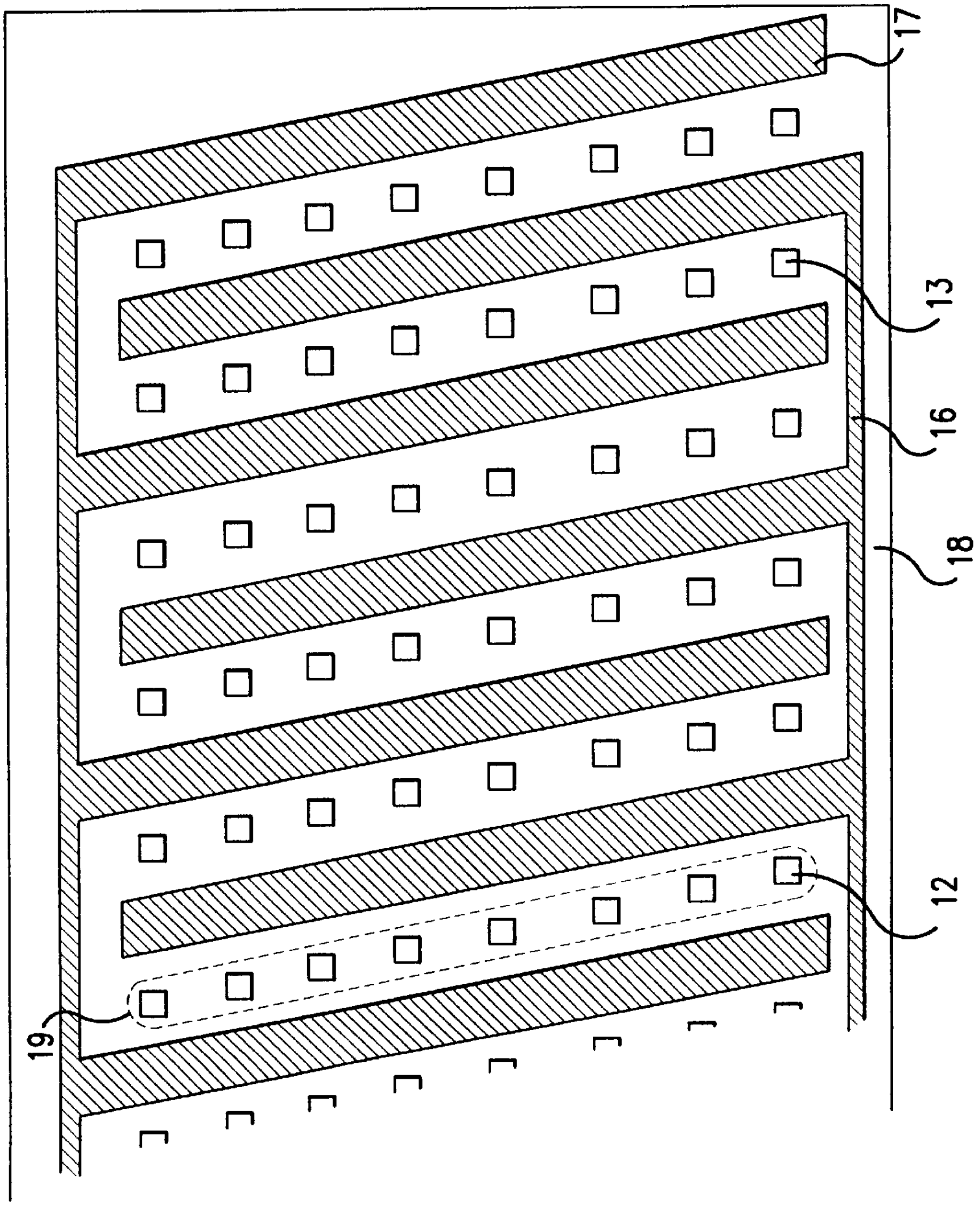
FIG. 3 shows a set of interdigitated electrodes used to electrostatically steer ink drops.

FIG. 3 shows a possible configuration for the steering electrodes 16 and 17 on the printhead 18. The steering electrodes 16 and 17 are interdigitated and one portion of the steering electrodes 16 or 17 lies between each column 19 of the apertures 13. Therefore, the print controller 1 can set the voltage potentials on the steering electrodes 16 and 17 such that an entire column 19 of apertures 13 will eject a series of ink drops 10 directed either toward the right, left or center position.

Figure 4:
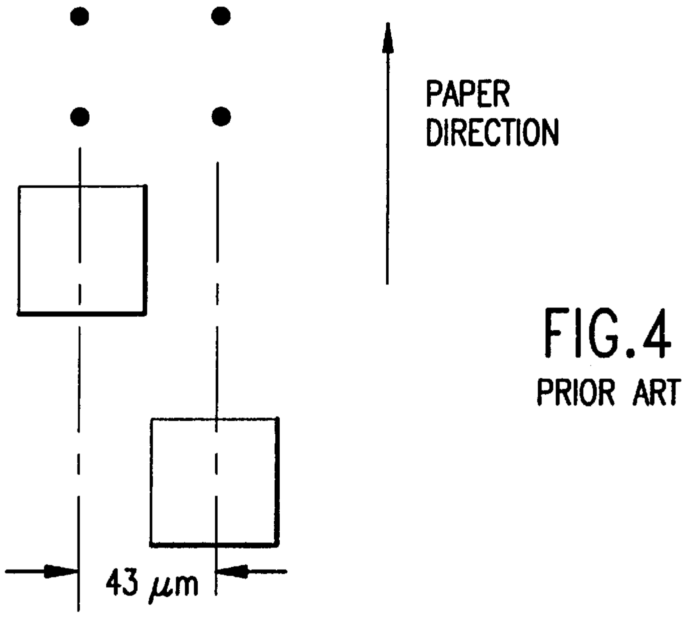
FIG.4 PRIOR ART
FIG. 4 shows the spot pattern created by a conventional printhead.

FIG. 4 shows the spot pattern created by a conventional acoustic ink jet printhead having a 600 spot per inch (spi) resolution capacity. Apertures within a column 19 of apertures 13 in the conventional ink jet printhead are offset at a center-to-center distance of approximately 43 microns in the direction perpendicular to the columns 19. Therefore, the spots created by the apertures 13 are spaced approximately 43 microns apart, thus giving a 600 spi resolution.

Figure 5:
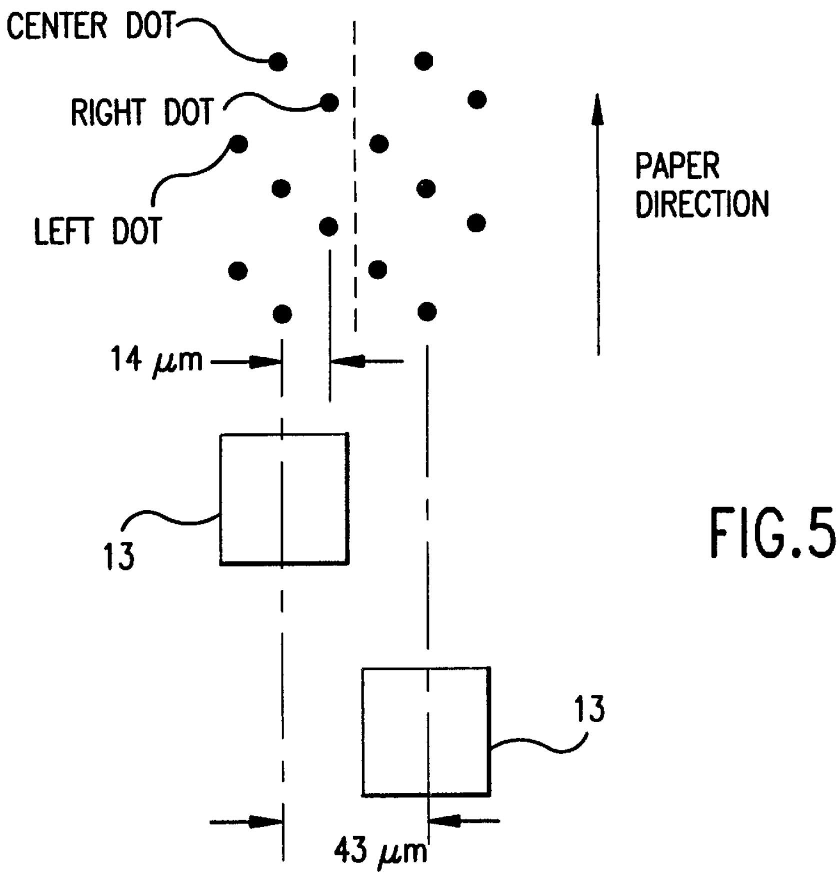
FIG. 5 shows the spot pattern created by the preferred embodiments of the invention.

FIG. 5 shows the spot pattern produced by the preferred embodiments of the invention. As in the conventional ink jet printhead, the apertures 13 in the preferred embodiments are also spaced at the center-to-center distance of approximately 43 microns. However, since the steering electrodes 16 and 17 are controlled by the print controller 1 to deflect the ink drops 10 to both left and right positions, the resolution of the printhead 18 is increased. The steering electrodes 16 and 17 are controlled such that the left and right spots are deflected approximately 14 microns from the center spot position. This places 3 dots within each 43 micron "pixel" centered on each column 19 of apertures 13, resulting in an overall center-to-center spacing for the dots of approximately 14–15 microns. A spot spacing of approximately 14 microns gives a resolution of approximately 1,800 spi in the horizontal direction.

Since the conventional ink jet printhead creates the spot pattern shown in FIG. 4 and has a relatively lower resolution, the conventional printhead uses more ink (i.e. more ink drops per unit area) to produce an image on the print substrate than a printhead of higher resolution. Higher ink use saturates the print substrate with the ink and results in cockle and curl of the print substrate. Also, higher resolution printheads exhibit greater greytone control, i.e. the ability to produce varying shades of grey in a printed image.

Figure 6:
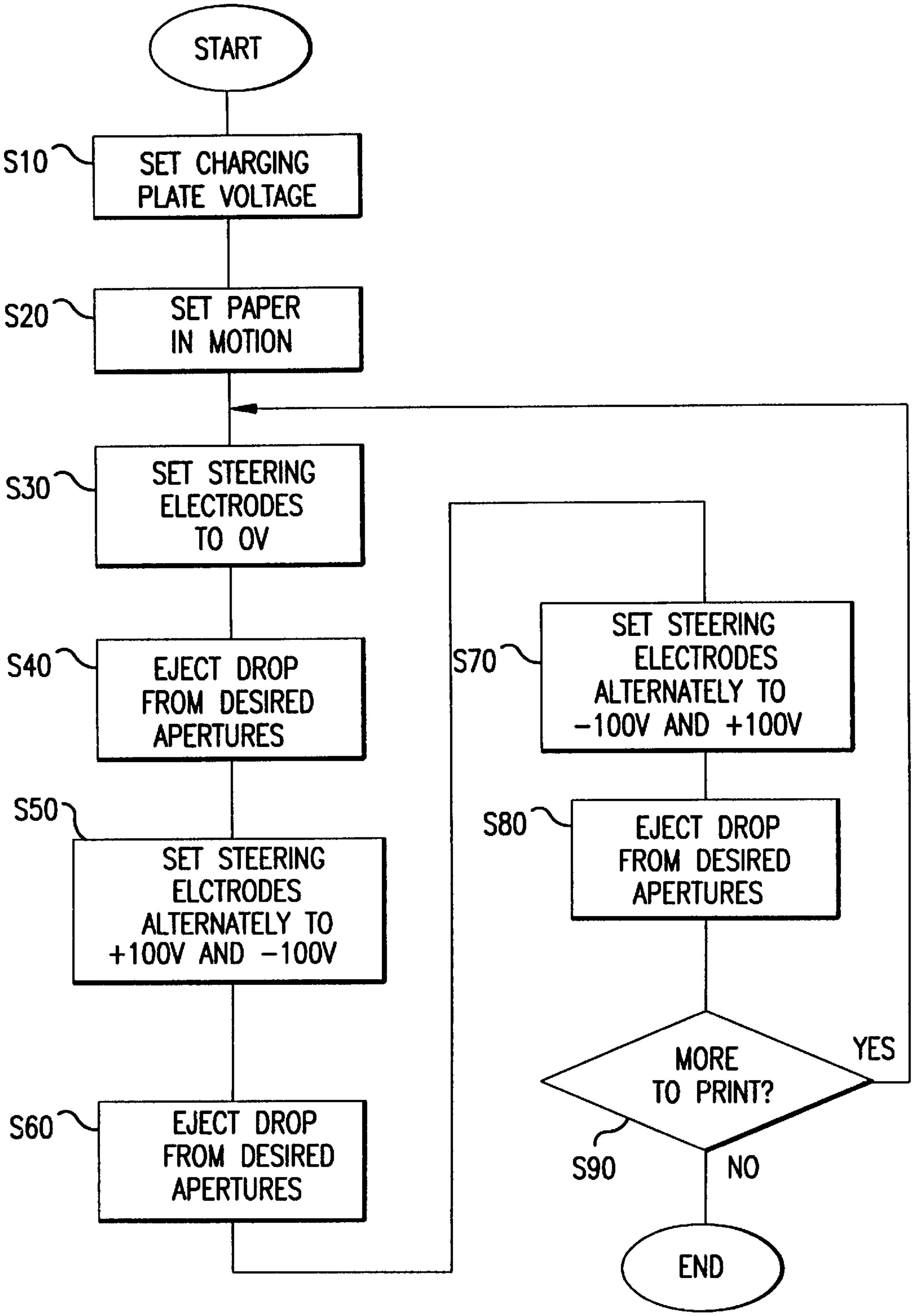
FIG. 6 is a flow chart for controlling the acceleration and steering of ink drops in the first embodiment of the invention.

FIG. 6 is a flowchart outlining the method for controlling the first embodiment of the invention. In step S10, the print controller 1 charges the charging plate 14 to −1000V . Next, in step S20, the print controller 1 moves the print substrate 15 relative to the printhead 18. In step S30, the print controller 1 grounds the steering electrodes 16 and 17 to 0V and the ink drops 10 are ejected from the desired apertures 13 in step S40. This series of steps creates the center spots produced by the columns 19 of apertures 13 as shown in FIG. 5.

In step S50, the print controller 1 charges the steering electrodes 16 and 17 to +100 V and −100 V , respectively. In step S60, the ink drops 10 are ejected from the desired apertures 13 to create a series of left or right deflected spots depending on which sides the steering electrodes 16 and 17 are on relative to the columns 19 of apertures 13. In step S70, the print controller 1 charges the steering electrodes 16 and 17 to −100V and +100V , respectively. That is, in step S70, the steering electrodes 16 and 17 are charged oppositely to the charges used in step S50. The ink drops 10 are then ejected from the desired apertures 13 in step S80, to create another set of left and right deflected ink drops 10 which are oppositely deflected from those ejected in step S60. In step S90, the print controller 1 determines if there is more printing to be done. If so, control jumps back to step S30. Otherwise, the print controller 1 stops printing.

Figure 7:
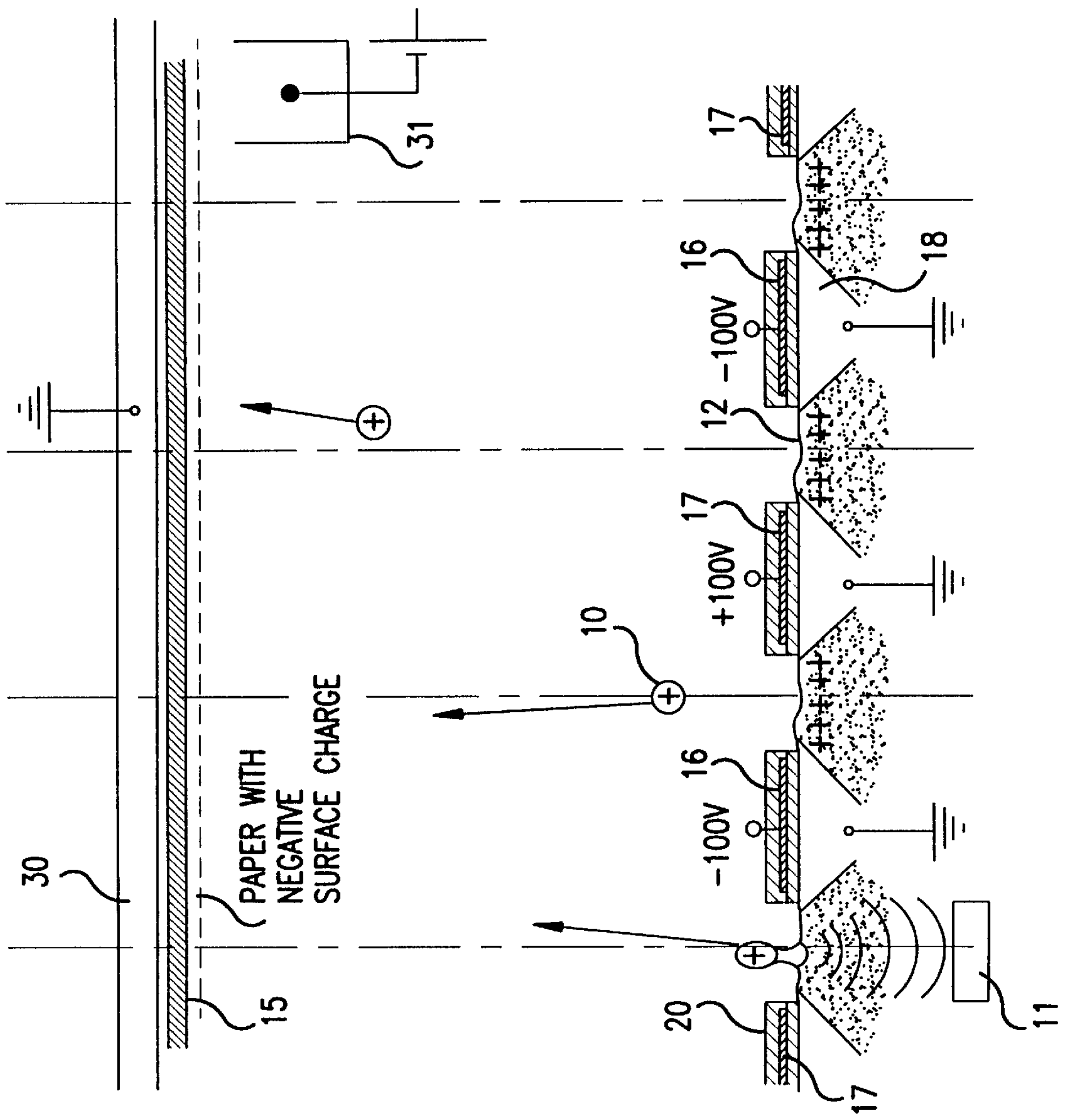
FIG. 7 is a second embodiment of the invention where a static charge on the print substrate serves to charge and accelerate ink drops toward the print substrate.

FIG. 7 shows the second preferred embodiment of the invention. The print head 18 is configured in the same manner as in the first preferred embodiment and operates similarly to eject the ink drops 10. However, a ground plate 30 is positioned behind the print substrate 15 and is connected to ground. A corona discharge device 31 or similar apparatus places a negative static charge on the surface of the print substrate 15. The negative surface charge on the print substrate 15 acts identically to the charging plate 14 of the first preferred embodiment. Control of the second preferred embodiment of the invention is the same as that shown in FIG. 6, except that in step S10 the print controller 1 directs the corona discharge device 31 to place the negative surface charge on the print substrate 15.

Another difference between the first and second preferred embodiments is the voltage potential created by the surface charge placed on the print substrate 15 in the second embodiment must be somewhat higher, possibly as high as −2000V , to maintain the proper charging and accelerating of the ink drops 10. The reason is that as the positively charged ink drops 10 impact the print substrate 15, some of the negative surface charge placed on the print substrate 15 is neutralized. The relatively higher static charge on the print substrate 15 compensates for the neutralizing effect of the positively charged ink drops 10 impacting the print substrate 15.

Figure 8:
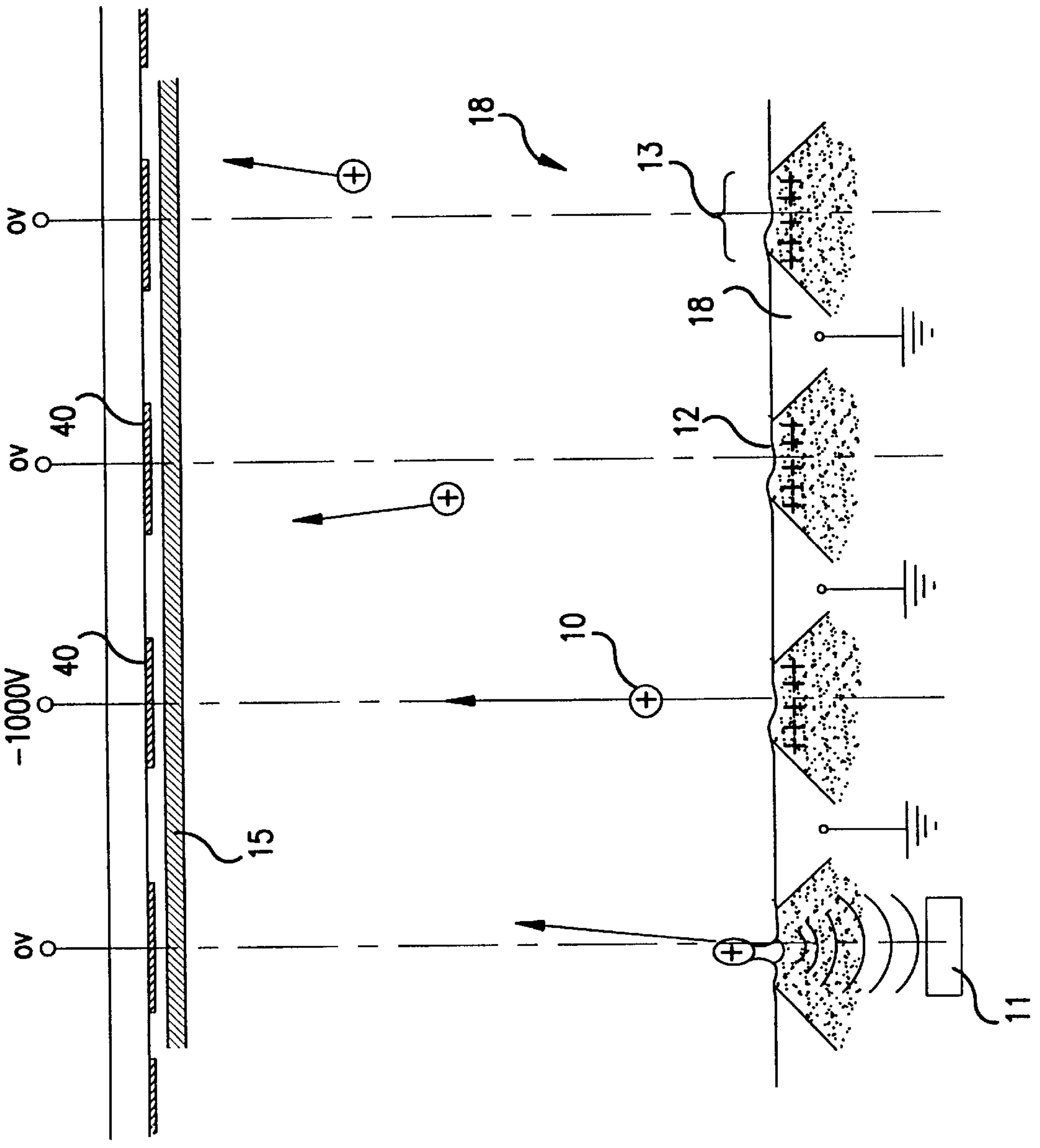
FIG. 8 is a third embodiment of the invention where electrodes situated behind the print substrate serve to charge, accelerate and steer ink drops.

FIG. 8 shows the third preferred embodiment of the invention. The printhead 18 operates identically to the printhead 18 in the first and second preferred embodiments in forming the ink drops 10. The ink drops 10 are positively charged due to the high negative potential, approximately −1000V , between the steering and accelerating electrodes 40 and the electrically grounded face of the printhead 18. The steering and accelerating electrodes 40 are positioned behind the print substrate 15 opposite each column 19 of apertures 13 on the printhead 18. By setting a first steering and accelerating electrode 40 to a high negative potential and the steering and accelerating electrodes 40 adjacent to the first steering and accelerating electrode 40 to a low voltage potential, approximately 0V , ink drops 10 are accelerated toward the print substrate 15 and steered as shown in FIG. 8. The ink drops 10 ejected from the column 19 of apertures 13 directly opposite the first steering and accelerating electrode 40 are accelerated toward the print substrate 15 and not steered either left or right. Ink drops 10 ejected from the columns 19 of apertures 13 positioned to the left and the right of the first steering and accelerating electrode 40 are accelerated toward the print substrate 15 and steered in the right and the left directions, respectively, as shown in FIG. 8. By altering the voltage potentials on the steering and accelerating electrodes 40, ink drops 10 ejected from the apertures 13 in each column 19 are steered in left, right or center directions. Therefore, the resulting spot pattern produced is identical to that shown in FIG. 5.

Figure 9:
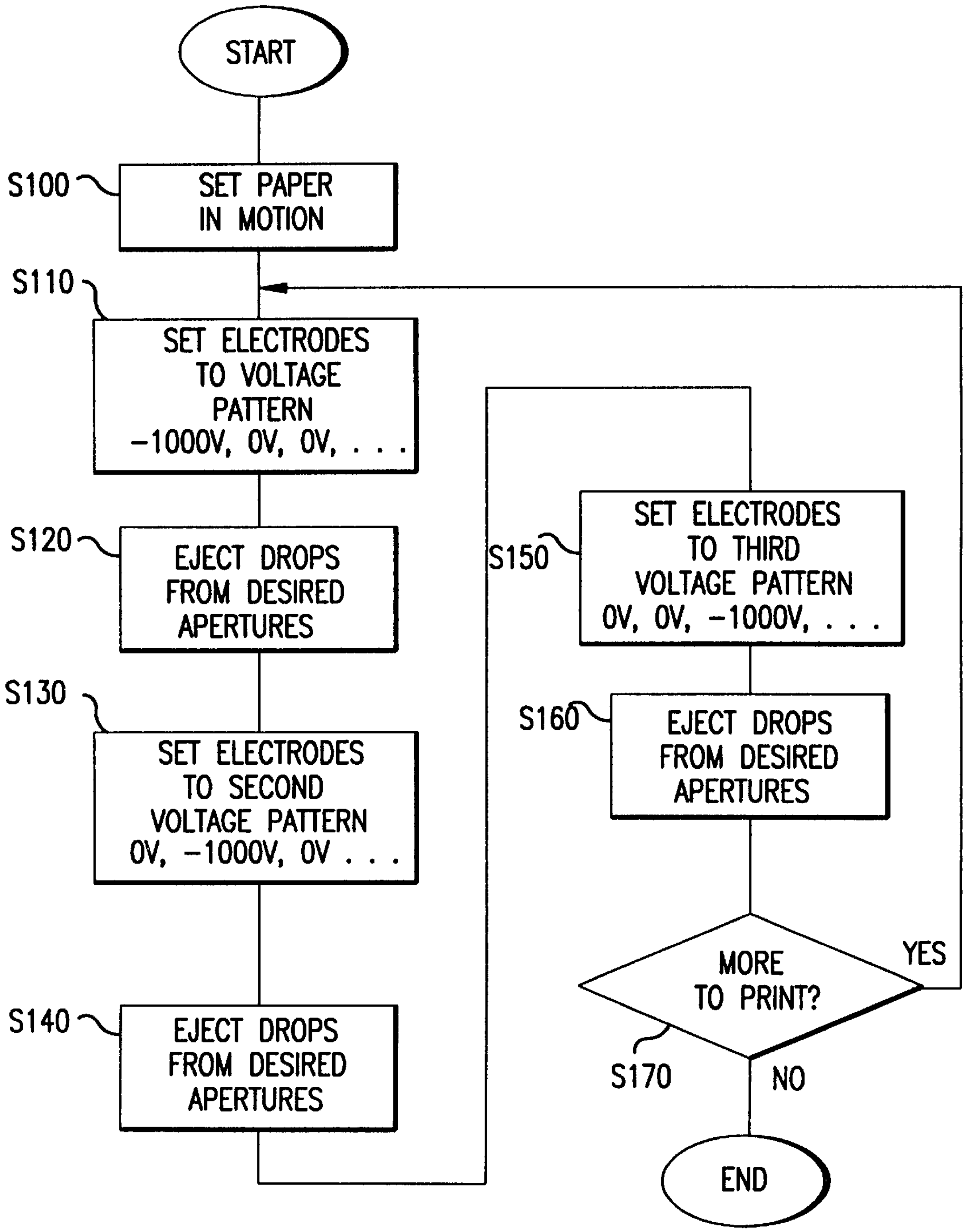
FIG. 9 is a flow chart for controlling the printing in the third embodiment of the invention.

FIG. 9 is a flow chart outlining the method for controlling the steering and accelerating electrodes 40 and the actuators 11 of the third preferred embodiment of the invention. In step S100, the print controller 1 moves the print substrate 15 into motion relative to the printhead 18. Next, in step S110, the print controller 1 charges the steering and accelerating electrodes 40 in a repeating pattern of −1000V , 0V , 0V , etc. That is, each $n^{th}$ steering and accelerating electrode is charged to 1000V , while each $n+1^{th}$ and $n+2^{th}$ steering and accelerating electrodes 40 are grounded. The ink drops 10 are then ejected from the desired apertures 13 in step S120 and steered in a first direction. The ink drops 10 ejected from a column 19 of apertures 13 will be directed to either a left, right or center position on the print substrate depending upon the position of the column 19 relative to the nearest steering and accelerating electrode 40 having the high negative voltage potential.

In step S130, the print controller 1 sets the steering and accelerating electrodes 40 to a second repeating voltage pattern of 0V , −1000V , 0V , etc. The ink drops 10 are then ejected from the desired apertures 13 in step S140. The change in the voltage pattern placed on the steering and accelerating electrodes 40 steers the ink drops 10 ejected from each column 19 of apertures 13 in a second direction different from the first direction. In step S150, the print controller 1 sets the steering and accelerating electrodes 40 to a third repeating voltage pattern of 0V, 0V, −1000V, etc. The ink drops 10 are again ejected from the desired apertures 13 in step S160. The third voltage pattern causes the ink drops 10 ejected from each column 19 of apertures 13 to be directed in a third direction different from the steering directions resulting from the first and second voltage patterns. Finally, in step 170, the print controller 1 determines if more printing is to be done. If more printing is needed, control jumps back to step S110. Otherwise, the print controller 1 stops printing.

Figure 10:
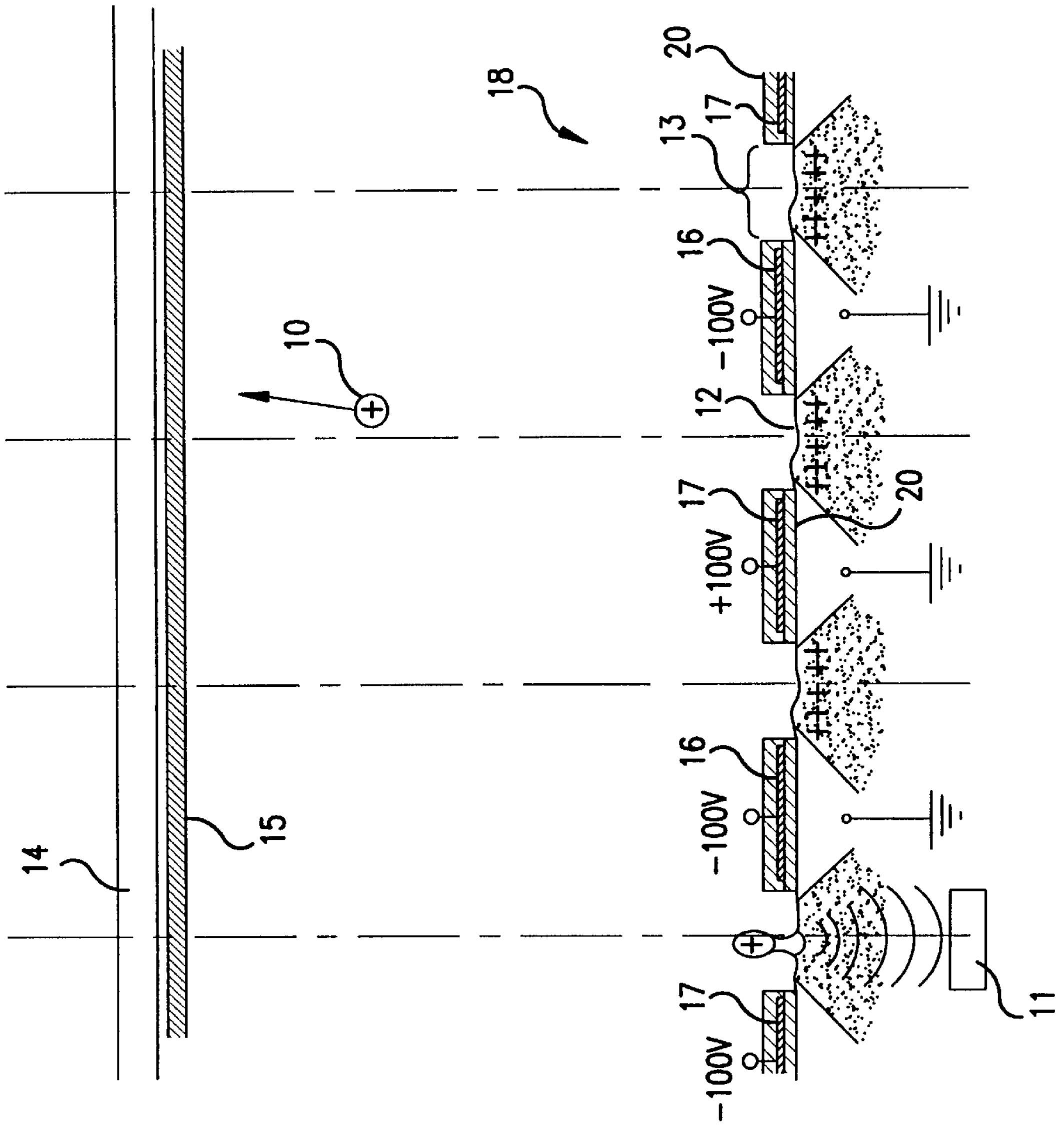
FIG. 10 is a fourth embodiment of the invention in which ink drops are charged and steered by electrodes formed on the face of the printhead.

FIG. 10 shows a fourth embodiment of the invention where the steering electrodes 16 and 17 serve to charge and steer ink drops 10. For example, the steering electrodes 16 and 17 could be both set to −100V as the ink drop 10 is first formed, as shown at the leftmost aperture 13 in FIG. 10. Once the ink drop 10 leaves the ink surface 12, the steering electrodes 16 and 17 could be set to a voltage pattern to steer the ink drop 10 as desired, as shown on the right side of FIG. 10. One skilled in the art will appreciate that the steering electrodes 16 and 17 can be set to voltages other than those shown in FIG. 10. The polarity of the voltages can also be altered to create negatively-charged ink drops 10 if desired. This is also true of the voltages and voltage patterns shown in the other embodiments of the invention.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention.

What is claimed is:

1. An ink jet printer for forming an image on a print substrate, comprising:

a printhead comprising,
  a face nearest the print substrate,
  a plurality of apertures formed in the face, and
  drop expelling means for expelling a drop, the drop having a velocity directed toward the print substrate;
drop accelerating means comprising a charged print substrate that induces a charge on an ink surface such that the expelled drops are charged and that accelerates the drops in a direction perpendicular to the print substrate; and
a controller controlling the drop expelling means and the drop accelerating means.

2. The printer of claim 1, wherein the drop accelerating means comprises:

corona discharge means for placing a charge on the print substrate.

3. The printer of claim 2, wherein the drop accelerating means comprises:

a ground plate on a side of the print substrate opposite the corona discharge means, the ground plate being electrically grounded.

4. An ink jet printer for forming an image on a print substrate, comprising:

a printhead comprising,
  a face nearest the print substrate,
  a plurality of apertures formed in the face, and
  drop expelling means for expelling a drop, the drop having a velocity directed toward the print substrate;
  drop accelerating means comprising a plurality of electrodes on a side of the print substrate opposite the printhead, each of the plurality of electrodes corresponding to a column of apertures on the printhead;
a controller controlling the drop expelling means and the drop accelerating means;
wherein the expelled drops are charged and accelerated in at least one of a direction perpendicular to the print substrate and a direction parallel to the print substrate based on charges on the plurality of electrodes.

5. An ink jet printer for forming an image on a print substrate, comprising:

a printhead having a print resolution and comprising:
  a face nearest the print substrate,
  a plurality of apertures formed in the face, and
  drop expelling means for expelling a drop, the drop having an initial velocity directed toward the print substrate;
drop charging means for charging expelled drops;
drop steering means comprising a first steering electrode formed on the face of the printhead and located adjacent to at least one of the plurality of apertures; and
a second steering electrode formed on the face of the printhead and located adjacent to the at least one of the plurality of apertures and on a side opposite the first electrode, wherein the first and second steering electrodes are interdigitated; and
a controller controlling the drop expelling means, the drop charging means and the drop steering means;
wherein charged drops are accelerated in directions parallel to the print substrate to increase the print resolution of the printhead.

6. A method for increasing a print resolution of a printer having an ink jet printhead and a print substrate, comprising the steps:

producing an electric field extending between the ink jet printhead and the print substrate;
expelling a charged ink drop from the ink jet printhead toward the print substrate, the expelled ink drop initially directed in a center trajectory defining a first print resolution; and
controlling the electric field such that the charged drop is directed in at least one direction other than the center trajectory to increase the print resolution of the printhead.

7. The ink jet printer of claim 5, wherein the first and second steering electrodes are controlled to charge the expelled drops.

* * * * *